(12) United States Patent
Yamamoto et al.

(10) Patent No.: US 9,229,285 B2
(45) Date of Patent: Jan. 5, 2016

(54) METHOD OF MANUFACTURING A DISPLAY DEVICE

(71) Applicant: Japan Display Inc., Mobara-shi, Chiba-ken (JP)

(72) Inventors: Masanao Yamamoto, Mobara (JP); Daisuke Sonoda, Chiba (JP); Osamu Itou, Hitachi (JP); Takato Hiratsuka, Chiba (JP)

(73) Assignee: JAPAN DISPLAY INC., Tokyo (JP)

( * ) Notice: Subject to any disclaimer, the term of this patent is extended or adjusted under 35 U.S.C. 154(b) by 332 days.

(21) Appl. No.: 13/851,211

(22) Filed: Mar. 27, 2013

(65) Prior Publication Data

US 2013/0323997 A1 Dec. 5, 2013

(30) Foreign Application Priority Data

May 29, 2012 (JP) ................................. 2012-121611

(51) Int. Cl.
*G02F 1/1337* (2006.01)
*C09K 13/00* (2006.01)
*G02F 1/1343* (2006.01)
*G02F 1/1333* (2006.01)

(52) U.S. Cl.
CPC ............ *G02F 1/13439* (2013.01); *C09K 13/00* (2013.01); *G02F 1/133377* (2013.01); *G02F 1/133707* (2013.01); *G02F 1/134309* (2013.01); *G02F 2201/128* (2013.01)

(58) Field of Classification Search
None
See application file for complete search history.

(56) References Cited

U.S. PATENT DOCUMENTS

| 6,755,983 | B2 * | 6/2004 | Yudasaka | 216/5 |
| 7,282,385 | B2 | 10/2007 | Gyoda et al. | |
| 7,887,710 | B2 * | 2/2011 | Ahn et al. | 216/23 |
| 8,053,171 | B2 | 11/2011 | Maekawa et al. | |
| 8,854,585 | B2 | 10/2014 | Kizu et al. | |
| 2001/0004280 | A1 * | 6/2001 | Kim et al. | 349/187 |
| 2003/0137557 | A1 * | 7/2003 | Nakamura | 347/44 |
| 2004/0113161 | A1 * | 6/2004 | Suzuki et al. | 257/83 |

(Continued)

FOREIGN PATENT DOCUMENTS

| JP | 6-214244 | 8/1994 |
| JP | 2005-266755 A | 9/2005 |

(Continued)

OTHER PUBLICATIONS

Office Action dated Jun. 30, 2015 regarding a corresponding Japanese Patent Application No. 2012-121611.

*Primary Examiner* — Anita Alanko
(74) *Attorney, Agent, or Firm* — Lowe Hauptman & Ham, LLP

(57) ABSTRACT

Provided is a method of manufacturing a display device that includes a structure formed so as to protrude at least in a normal direction of a first substrate, and an electrode formed in a side wall surface of the structure, the method including: forming a transparent conductive film for the electrode; forming a low-affinity material having a low affinity for a resist film on an upper surface of the transparent conductive film formed in a head surface of the structure; forming a resist film by applying a liquid resist material to an upper layer of the transparent conductive film and then fixing the resist material; forming an opening that exposes the transparent conductive film in the resist film by removing the low-affinity material; etching the transparent conductive film which is a lower layer using the resist film as a protective film; and removing the resist film.

9 Claims, 9 Drawing Sheets

(56) References Cited

U.S. PATENT DOCUMENTS

| | | | |
|---|---|---|---|
| 2004/0129943 A1* | 7/2004 | Yoo et al. | 257/72 |
| 2005/0035983 A1* | 2/2005 | Cruchon-Dupeyrat et al. | 346/140.1 |
| 2006/0222865 A1* | 10/2006 | Hoshino et al. | 428/446 |
| 2007/0148800 A1* | 6/2007 | Yang et al. | 438/30 |
| 2007/0207565 A1* | 9/2007 | Kodas et al. | 438/61 |
| 2007/0278487 A1* | 12/2007 | Choung et al. | 257/59 |
| 2009/0155544 A1* | 6/2009 | Nakamura et al. | 428/189 |
| 2009/0236627 A1* | 9/2009 | Kim et al. | 257/99 |
| 2011/0020975 A1* | 1/2011 | Wu et al. | 438/72 |
| 2011/0175088 A1* | 7/2011 | Kim et al. | 257/57 |
| 2013/0188117 A1* | 7/2013 | Itou et al. | 349/106 |
| 2013/0321894 A1* | 12/2013 | Park et al. | 359/290 |

FOREIGN PATENT DOCUMENTS

| | | |
|---|---|---|
| JP | 2005-334864 A | 12/2005 |
| JP | 2010-224406 A | 10/2010 |

* cited by examiner

METHOD OF MANUFACTURING A DISPLAY DEVICE

CROSS-REFERENCE TO RELATED APPLICATION

The present application claims priority from Japanese application JP 2012-121611 filed on May 29, 2012, the content of which is hereby incorporated by reference into this application.

BACKGROUND OF THE INVENTION

1. Field of the Invention

The present invention relates to a method of manufacturing a display device, and more particularly, to a manufacturing method that can be applied to a display device having a wall-shaped electrode that is formed so as to protrude from a substrate surface.

2. Description of the Related Art

In recent years, as a property of a liquid crystal display device is improved, there is a demand for the development of products that enable a WVGA display of 800×480 pixels even in a small and medium-sized liquid crystal display device of 3 to 4 inches. However, in the small and medium-sized liquid crystal display panel that enables the WVGA display, it is necessary to form a plurality of display pixels (hereinafter, referred to as simply 'pixels') in a limited display area, and thus a width of one pixel is about 30 μm. For this reason, there is a demand for further increase in aperture ratio and in display mode efficiency.

For example, JP6-214244A discloses a liquid crystal display device as a liquid crystal display device that increases the display mode efficiency. In the liquid crystal display device, paired electrodes are formed at two ends of a pixel area, an image signal is applied to one electrode (pixel electrode, source electrode) of the electrodes, and a common signal as a reference signal is applied to the other electrode (common electrode) so as to generate an electric field (so-called horizontal electric field) that is parallel to a principal surface of a liquid crystal display panel, and thus liquid crystal molecules are driven. In particular, in the liquid crystal display device, since the pixel electrode and the common electrode are formed so as to protrude toward a second substrate from a principal surface of a first substrate, the liquid crystal display device has a wall-like electrode shape that is formed such that an extension direction thereof is perpendicular to the principal surface of the first substrate. By configuring the liquid crystal display device in such a manner, the display mode efficiency can be improved by equalizing the density of lines of electric force in both an area close to the first substrate and an area far from the first substrate (area close to second substrate).

However, in the liquid crystal display device, an area is formed where an electrode is not present between wall electrodes disposed in a pixel boundary and a pair of common electrodes (hereinafter, referred to as pseudo wall electrodes) disposed between the wall electrodes. In other words, in the pixel boundary portion, two wall electrodes (for example, common electrodes) corresponding to each of adjacent pixels are disposed in parallel with each other, and thus other electrodes are not formed between the two wall electrodes formed in the pixel boundary.

In this regard, for example, there is a liquid crystal display device in which a wall-shaped common electrode formed along an extension direction of a pair of wall electrodes is formed in an area between wall electrodes disposed in a pixel boundary. In the liquid crystal display device, a flat plate-shaped electrode (transparent electrode) that extends from the wall electrodes is also formed in an area between the wall electrodes formed in the pixel boundary and the wall-shaped common electrode. Further, the electrode extending from the wall electrodes is formed together with the wall-shaped common electrode with an insulating film interposed therebetween along a side wall surface of the wall-shaped common electrode. In this configuration, in the wall-shaped common electrode, a conductive film is formed so as to cover a head surface and a side wall surface of a columnar body that extends in a long-side direction of a pixel. In particular, a line of electric force leading to the conductive film that is formed in the head surface of the columnar body with a liquid crystal layer interposed therebetween is formed in the wall-shaped common electrode, and thus liquid crystal molecules are driven. For this reason, in this pixel structure, it is necessary to expose the conductive film formed in the head surface of the columnar body and to cover the conductive film formed in the side wall surface of the columnar body by the conductive film extending from the wall-shaped electrode.

On the other hand, thin films such as a thin film transistor and a pixel electrode that forms the liquid crystal display device are generally formed using a well-known photolithography technique. For example, in forming the wall-shaped common electrode that is formed so as to be exposed from the conductive film extending from the wall electrode, a conductive film to cover a cuboid and an insulating film to cover the conductive film are formed, and another conductive film is formed in an upper layer thereof. Next, after applying a resist material formed of a photocurable resin or the like thereto, a resist surface is irradiated with light having a desired pattern, and it is then developed, and thus a resist having a desired shape is formed. Thereafter, the conductive film that is exposed from the resist is etched using the resist as an etching mask (protective film) so that only the conductive film of the head surface of the cuboid is exposed from the conductive film that forms the wall-shaped electrode.

However, in forming the thin film using photolithography, When exposing the resist, the resist is exposed using a well-known photomask. At this time, the positioning accuracy between the photomask and the first substrate becomes very important. For example, when only the head surface of the columnar body is etched, that is, when a wall-shaped pixel electrode is formed, there is a need to form an etching mask to expose only the head surface of the cuboid. In this case, when a positive resist in which a light-irradiated portion is removed by a developing process is used, an exposing process is performed using a photomask in which only the head surface of the columnar body is irradiated with light. However, since it is necessary to form the conductive film in the side wall surface portion of the columnar body along the side wall surface, the positioning accuracy in a direction of the side wall surface of the columnar body is required to be higher than the thickness of the conductive film.

In particular, the side wall surface of the columnar body of which a cross-section has a rectangular shape, a transparent conductive film that is formed so as to cover the head surface, and the insulating film which is a lower layer thereof have significantly small thicknesses. For this reason, the positioning accuracy between the photomask and the first substrate needs to be significantly high, and it is necessary to use a photomask with a significantly high formation accuracy, and thus there is a demand for the development of a technique for forming a wall-shaped common electrode at the same level of accuracy as a thin film formed in an in-plane direction of the first substrate.

SUMMARY OF THE INVENTION

The invention is accomplished in view of the above-mentioned problems, and an object of the invention is to provide a method of manufacturing a display device capable of improving the display mode efficiency by equalizing the electric field distribution in a pixel.

(1) In order to solve the above-described problem, there is provided a method of manufacturing a display device that includes a structure that is formed so as to protrude at least in a normal direction of a first substrate, and an electrode that is formed in a side wall surface of the structure, the method including: forming a transparent conductive film which becomes the electrode; forming a low-affinity material having a low affinity for a resist film on an upper surface of the transparent conductive film that is formed in a head surface of the structure; forming a resist film by applying a liquid resist material to an upper layer of the transparent conductive film and then fixing the resist material; forming an opening that exposes the transparent conductive film in the resist film by removing the low-affinity material; etching the transparent conductive film which is a lower layer using the resist film as a protective film; and removing the resist film.

(2) In order to solve the above-described problem, there is also provided a method of manufacturing a display device that includes a structure that is formed so as to protrude at least in a normal direction of a first substrate, and an electrode that is formed in a side wall surface of the structure, the method including: forming a low-affinity material having a low affinity for a transparent conductive film which becomes the electrode in a head surface of the structure; forming the transparent conductive film which becomes the electrode on an upper surface of the first substrate; and removing the low-affinity material and selectively removing only the transparent conductive film that is formed so as to overlap with an upper surface of the low-affinity material by the removal of the low-affinity material.

According to the invention, the display mode efficiency can be improved by equalizing the electric field distribution in a pixel.

Other effects of the invention will become apparent from the description of the whole specification.

DETAILED DESCRIPTION OF THE INVENTION

Figure 1:
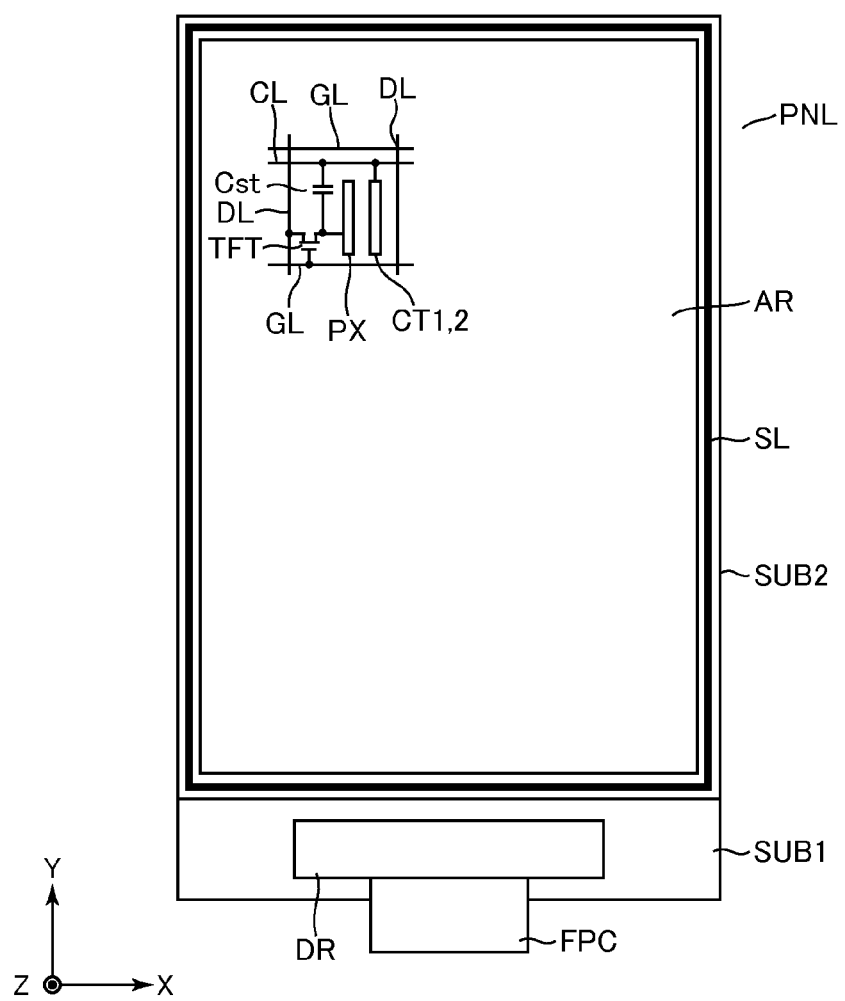
FIG. 1 is a plan view illustrating the entire configuration of a liquid crystal display device which is a display device according to a first embodiment of the invention.

Hereinafter, embodiments of the invention will be described with reference to the accompanying drawings. In this regard, in the following description, like reference numerals denote like elements, and thus their description will not be repeated. In addition, X, Y, and Z denote an X-axis, a Y-axis, and a Z-axis, respectively.

[First Embodiment]

FIG. 1 is a plan view illustrating the entire configuration of a liquid crystal display device which is a display device according to a first embodiment of the invention. Hereinafter, the entire configuration of the liquid crystal display device of the invention will be described with reference to FIG. 1. Meanwhile, in the specification of the present application, transmittance after excluding the influence of absorption and the influence of an aperture ratio by a color filter CF or a polarization plate is set to display mode efficiency. Accordingly, when a vibration direction of a linearly-polarized light that is emitted from a polarization plate on a backlight unit side is incident on a polarization plate on a display surface side, the display mode efficiency in a case where the vibration direction rotates 90 degrees is 100%.

As shown in FIG. 1, the liquid crystal display device of the invention includes a liquid crystal display panel PNL including a first substrate SUB1 in which pixel electrodes PX, thin film transistors TFT, and the like are formed, a second substrate SUB2 that is disposed so as to face the first substrate SUB1 and in which a color filter and the like are formed, and a liquid crystal layer that is interposed between the first substrate SUB1 and the second substrate SUB2. In addition, the liquid crystal display device is configured by combining the liquid crystal display panel PNL with a backlight unit (backlight device) which serves as a light source and is not shown in the drawing. The first substrate SUB1 and the second substrate SUB2 are fixed using a seal material SL that is applied to a peripheral portion of the second substrate in a circular pattern, and liquid crystal is also sealed. However, in the liquid crystal display device according to the first embodiment, an area in which a display pixel (hereinafter, referred to as simply 'pixel') is formed in the area where the liquid crystal is sealed becomes a display area AR. Accordingly, even in the area where the liquid crystal is sealed, an area which is not associated with display because a pixel is not formed does not become the display area AR.

In addition, the second substrate SUB2 has an area that is smaller than the first substrate SUB1, and exposes an edge portion of the first substrate SUB1 on the lower side of FIG. 1. A driving circuit DR constituted by a semiconductor chip is mounted on the edge portion of the first substrate SUB1. The driving circuit DR drives each pixel that is disposed in the display area AR. Meanwhile, in the following description, even the description of the liquid crystal display panel PNL can be referred to as a liquid crystal display device. In general, the first substrate SUB1 and the second substrate SUB2 use, for example, a well-known glass substrate as a base material, or may be resinous transparent insulating substrates.

In the liquid crystal display device according to the first embodiment, in the display area AR that is a surface on the liquid crystal side of the first substrate SUB1, scanning signal lines GL (gate lines) are formed that extend in an X-axis direction and are disposed in parallel with each other in a Y-axis direction as shown in FIG. 1 and through which scanning signals from the driving circuit DR are applied. In addition, image signals lines DL (drain lines) are formed that extend in the Y-axis direction and are disposed in parallel with each other in the X-axis direction as shown in FIG. 1 and through which image signals (gradation signals) from the driving circuit DR are applied. An area that is surrounded by adjacent two drain lines DL and adjacent two gate lines GL constitutes the pixel, and a plurality of the pixels are disposed in the display area AR in a matrix pattern along the drain lines DL and the gate lines GL.

For example, as shown in FIG. 1, each pixel includes the thin film transistor TFT that is turned on or turned off in response to the scanning signals from the gate lines GL, the wall pixel electrode PX to which the image signals from the drain lines DL are applied via the turned-on thin film transistor TFT, and a wall common electrode CT to which a common signal having a potential which becomes a reference with respect to potentials of the image signals is applied via the common line CL. Although FIG. 1 schematically illustrates the pixel electrode PX and the common electrode CT in a linear manner, configurations of the wall pixel electrode PX and the wall common electrode CT of the first embodiment will be described later. Meanwhile, the thin film transistor TFT of the first embodiment is driven such that a drain electrode and a source electrode are switched by a bias application thereof. In the present specification, for convenience of description, a side connected to the drain line DL and a side connected to the wall pixel electrode PX will be referred to as the drain electrode and the source electrode, respectively.

An electric field having a component parallel to a principal surface of the first substrate SUB1 is generated between the wall pixel electrode PX and the wall common electrode CT, and thus the liquid crystal molecules are driven by the electric field. Such a liquid crystal display device is known as a display device that enables a so-called wide viewing angle display, and is referred to as a horizontal electric field type display device because of the application singularity of the electric field to the liquid crystal. In addition, the liquid crystal display device according to the first embodiment performs a display in a normally-black display manner that minimizes light transmittance (black display) when an electric field is not applied to the liquid crystal and that increases the light transmittance by applying an electric filed thereto.

Each drain line DL and each gate line GL extend over the seal material SL at ends thereof, and are connected to the driving circuit DR that generates driving signals such as the image signals and the scanning signals on the basis of an input signal that is input from an external system via a flexible print substrate FPC. Although the liquid crystal display device according to the first embodiment is configured such that the driving circuit DR is formed of the semiconductor chip and is mounted on the first substrate SUB1, any one of or both an image signal driving circuit that outputs the image signals and a scanning signal driving circuit that outputs the scanning signals may be mounted on the flexible print substrate FPC in a tape carrier manner or a COF (Chip On Film) manner so as to be connected to the first substrate SUB1.

Specific Configuration of Pixel

Figure 2:
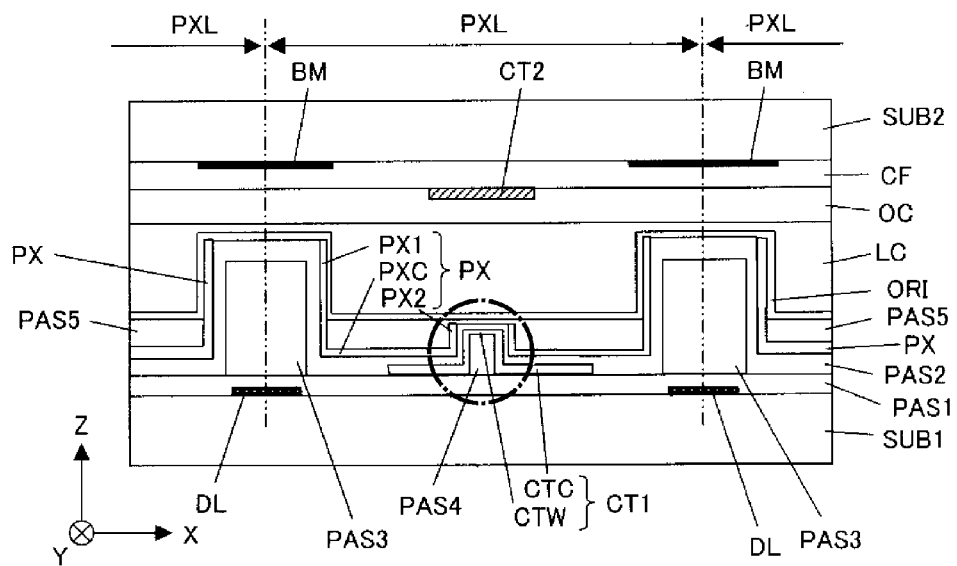
FIG. 2 is a cross-sectional view illustrating a pixel configuration in the liquid crystal display device which is a display device according to the first embodiment of the invention.

FIG. 2 is a cross-sectional view illustrating a pixel configuration in the liquid crystal display device according to the first embodiment of the invention, in particular, a cross-sectional view of the pixel in a short-side direction. However, in the cross-sectional view shown in FIG. 2, a well-known polarization plate that is disposed in surfaces (display surface and rear surface of liquid crystal display device) of the first substrate SUB1 and the second substrate SUB2 which face a liquid crystal layer LC, and an orientation film that is formed in a surface of the second substrate SUB2 which faces the liquid crystal layer LC will be omitted. In addition, the polarization plate may be formed in the surfaces of the first substrate SUB1 and the second substrate SUB2 which face the liquid crystal layer LC using a well-known technique.

As shown in FIG. 2, in the liquid crystal display device according to the first embodiment, the first substrate SUB1 and the second substrate SUB2 are disposed so as to face each other with the liquid crystal layer LC interposed therebetween. At this time, in the pixel of the first embodiment, the drain lines DL are formed in an upper surface (liquid crystal side surface) of the first substrate SUB1, and an insulating film PAS1 is formed so as to cover the drain lines DL. In the liquid crystal side surface of the insulating film PAS1, columnar insulating films (hereinafter, referred to as wall electrode insulating film) PAS3 that has a large convex shape, has a cross-section having a nearly rectangular shape, and extends in the Y-axis direction is formed. In addition, the wall electrode insulating film PAS3 is formed in a boundary portion (pixel boundary portion) with an adjacent pixel which is a peripheral portion of the pixel, with respect to the arrangement of the pixel in the X-axis direction. In a side surface (side wall surface) of the wall electrode insulating film PAS3, a transparent conductive film formed of, for example, a well-known ITO (tin-doped indium oxide), GZO, or AZO is formed so as to cover the side surface (side wall surface), and thus a first wall-shaped electrode PX1 is configured. In addition, a transparent conductive film that extends in a planar direction (in-plane direction of first substrate SUB1) is formed from a peripheral portion of the first wall-shaped electrode PX1 on the substrate side, and thus a flat electrode PXC is configured. Further, a transparent conductive film is formed that extends in a direction of the second substrate SUB2 from a peripheral portion of the flat electrode PXC on a common electrode CT1 side, and thus a second wall-shaped electrode PX2 is configured. At this time, the first wall-shaped electrode PX1, the flat electrode PXC, and the second wall-shaped electrode PX2 are electrically connected to each other, and thus the first wall-shaped electrode PX1, the flat electrode PXC, and the second wall-shaped electrode PX2 collectively constitute the wall pixel electrode (first electrode) PX. In particular, in the first embodiment, an insulating film PASS is formed between the flat electrode PXC and the liquid crystal layer LC, and the first wall-shaped electrode PX1 is disposed in the pixel boundary, and thus one pixel PXL is constituted by a pair of wall pixel electrodes PX.

Between the pair of wall pixel electrodes PX (first wall-shaped electrode PX1) constituting the pixel of the first embodiment, a pair of electrodes (common electrodes) CT1 and CT2 are disposed so as to face each other with the liquid crystal layer LC interposed therebetween. In other words, the common electrode CT2 is formed on the second substrate SUB2 side, and the common electrode CT1 is formed on the first substrate SUB1 side, and thus a pseudo wall common electrode (hereinafter, referred to as pseudo wall common electrode) CT is constituted by two common electrodes CT1 and CT2. Meanwhile, in the pixel configuration of the first embodiment, although a pair of wall pixel electrodes PX extending from two ends of the pixel are used as the source electrode to which the image signals are applied, and the pseudo wall common electrode CT interposed between the pair of wall pixel electrodes PX is used as the common electrode to which the common signals are applied, the common signals may be applied to the wall pixel electrode PX at two ends of the pixel, and the image signals may be applied to the pseudo wall common electrode CT. However, in this case, the common electrode CT2 is not provided.

Figure 3:
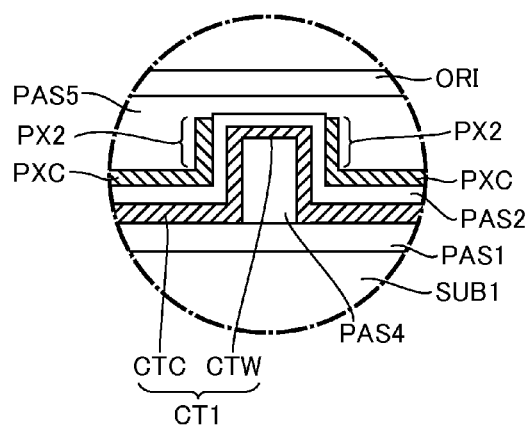
FIG. 3 is a partially enlarged view of a structure shown in FIG. 2.

In addition, as shown in FIG. 3, in the liquid crystal side surface of the insulating film PAS1, a columnar insulating film (hereinafter, referred to as pseudo wall electrode insulating film) PAS4 that has a smaller convex shape than the wall electrode insulating film PAS3, has a cross-section having a nearly rectangular shape, and extends in the Y-axis direction is formed. The pseudo wall electrode insulating film PAS4 is formed in an area between a pair of wall electrode insulating films PAS3 that are formed at least in a short-side direction of the pixel (X-axis direction of the pixel). In the pseudo wall electrode insulating film PAS4, an end of the pixel holding electrode PXC is formed along the side wall surface thereof so as to protrude (extend) toward the liquid crystal layer LC side, that is, the second substrate SUB2 side, and thus the second wall-shaped electrode PX2 which serves as a wall-shaped electrode is formed. In other words, in the pixel configuration of the first embodiment, the wall-shaped electrodes PX1 and PX2 along the side wall surfaces of the wall electrode insulating film PAS3 and the pseudo wall electrode insulating film PAS4 for forming the wall-shaped electrode are provided, and the common electrode CT1 is configured such that only a portion formed in a head surface of the pseudo wall electrode insulating film PAS4 is exposed to the liquid crystal layer LC side, that is, the second substrate SUB2 side.

In other words, in the transparent conductive film forming the common electrode CT1, the transparent conductive film of other portions except for the portion formed in the head surface of the pseudo wall electrode insulating film PAS4 is disposed so as to face the transparent conductive film forming the wall pixel electrode PX with the insulating film PAS2 interposed therebetween. In this configuration, only a portion of the common electrode CT1 formed in the head surface of the pseudo wall electrode insulating film PAS4 is disposed closer to the liquid crystal layer LC than the wall pixel electrode PX, and other electrode portions are disposed closer to the first substrate SUB1 than the flat electrode PXC. Accordingly, as shown in FIG. 2, the second wall-shaped electrode PX2 is disposed such that the common electrode CT1 is disposed so as to be spaced apart from the insulating film PAS2 which is a thin insulating interlayer by the film thickness, and thus a very dense line of electric force is generated between the second wall-shaped electrode PX2 and the common electrode CT1. As a result, a strong electric field may be obtained between the second wall-shaped electrode PX2 and the common electrode CT1, and the liquid crystal layer LC on the pseudo wall common electrode CT is more likely to move due to the strong electric field, and thus the pixel configuration of the first embodiment may obtain higher display mode efficiency than a pixel configuration having a wall-shaped electrode of the related art. At this time, since the common electrode CT1 is formed in the lower layer of the second wall-shaped electrode PX2 with the insulating film PAS2 interposed therebetween, the thickness of the insulating film PAS2, that is, an interlayer distance between the second wall-shaped electrode PX2 and the common electrode CT1 is reduced, thereby allowing a stronger electric field to be generated between the two electrodes.

In addition, in the pixel configuration of the first embodiment, in order to realize a wall-shaped structure that is lower than the wall electrode insulating film PAS3, a columnar insulating film (hereinafter, referred to as pseudo wall electrode insulating film) PAS4 extending in the same direction (Y-axis direction) as the wall electrode insulating film PAS3 is formed between the wall electrode insulating films (first structures) PAS3 at the pixel boundary. The common electrode (second electrode) CT1 which is an electrode on the first substrate SUB1 side of the pseudo wall common electrode CT is formed so as to cover the pseudo wall electrode insulating film (second structure) PAS4, and extends in a planar direction (in-plane direction of first substrate SUB1) from a surface of the pseudo wall electrode insulating film PAS4 which comes in contact with the substrate. In the common electrode CT1, a flat common electrode (second flat electrode) CTC that extends from an electrode (hereinafter, referred to as wall-shaped common electrode) CTW covering the pseudo wall electrode insulating film PAS4 is disposed so as to overlap with the flat electrode PXC constituting the wall pixel electrode PX with the insulating interlayer PAS2 interposed therebetween, and thus a retentive capacity Cst is formed. At this time, in the wall common electrode CTW, the side wall surface of the pseudo wall electrode insulating film PAS4 and the second wall-shaped electrode PX2 overlap with each other with the insulating interlayer PAS2 interposed therebetween, and thus the overlap portion contributes to the formation of the retentive capacity Cst. As such, in the pixel configuration of the first embodiment, since the retentive capacity Cst is formed of the wall pixel electrode PX and the common electrode CT1, it is unnecessary to form an electrode for forming the retentive capacity Cst in each pixel. As a result, an area of the pixel through backlight passes can be increased, and thus an aperture ratio can be improved, thereby improving the pixel quality.

In addition, in the pixel configuration of the first embodiment, it is possible to shield the line of electric force, in the second flat electrode CTC, which turns around from the adjacent pixel and the drain lines DL during a black display via the first substrate. Accordingly, even in a configuration in which the pseudo wall electrode is formed by the common electrode CT1 disposed on the first substrate SUB1 side and the common electrode CT2 disposed on the second substrate SUB2 side, it is possible to prevent an electric field (line of electric force) generated between the pseudo wall electrode CT of the pixel PXL during the black display and another pixel PXL adjacent to the pixel PXL and the drain line DL from reaching the liquid crystal layer LC, and thus the display mode efficiency during the black display can be reduced (improved).

Further, in the pixel configuration of the first embodiment, during a white display, the flat electrode PXC forming the wall pixel electrode PX serves as a shielding electrode that shields the electric field generated from the pixel electrode PX to the adjacent pixel PXL. Accordingly, even in a configuration in which the pseudo wall electrode CT is formed by the common electrode CT1 disposed on the first substrate SUB1 side and the common electrode CT2 disposed on the second substrate SUB2 side, and a pair of pixel electrodes PX are formed with the pseudo wall common electrode CT interposed therebetween, it is possible to prevent the electric field generated from the adjacent pixel and adjacent signal lines from turning around from the first substrate SUB1 side and being applied to the liquid crystal molecules in the pixel PXL.

In other words, in the pixel configuration of the first embodiment, since other end of the flat electrode PXC extending from a lower end of the wall pixel electrode PX is formed so as to be connected to the second wall-shaped electrode PX2 formed in the side wall surface of the pseudo wall electrode insulating film PAS4 that forms the pseudo wall common electrode CT, the line of electric force generated from the flat electrode PXC is almost directed to the pseudo wall common electrode CT. Accordingly, the electric field intensity between the wall pixel electrode PX and the pseudo wall common electrode CT can be uniformalized, and thus white display mode efficiency can be improved.

On the other hand, on the liquid crystal surface side of the second substrate SUB2 that is disposed so as to face the first substrate SUB1 with the liquid crystal layer LC interposed therebetween, black matrixes BM which are shielding layers, the color filters CF corresponding to R (red), G (green), and B (blue), the common electrode (third electrode) CT2, and an overcoat layer OC that covers an upper surface thereof are formed.

[Detailed Description of Manufacturing Method]

FIGS. 4A to 4F are diagrams illustrating a process of forming the wall pixel electrode in the liquid crystal display device according to the first embodiment of the invention. Hereinafter, a method of manufacturing a portion of the second wall-shaped electrode PX2 that overlaps with the wall common electrode CTW with the insulating film PAS2 interposed therebetween will be described in detail with reference to FIGS. 4A to 4F. However, in the liquid crystal display device according to the first embodiment, processes of forming other thin films except for the process of forming the second wall-shaped electrode PX2 that is formed in the first substrate SUB1 are the same as those in the related art. In addition, in the following description, although the process of forming the second wall-shaped electrode PX2 will be described in detail, the process of forming the first wall-shaped electrode PX1 is the same as the process of forming the second wall-shaped electrode PX2. In addition, in the liquid crystal display device according to the first embodiment, since all openings formed in a resist REG are formed of a low-affinity material LAF, a hydrophilic resist material that is not sensitive to light can also be used.

a) Process of Forming Transparent Conductive Film

Figure 4A:
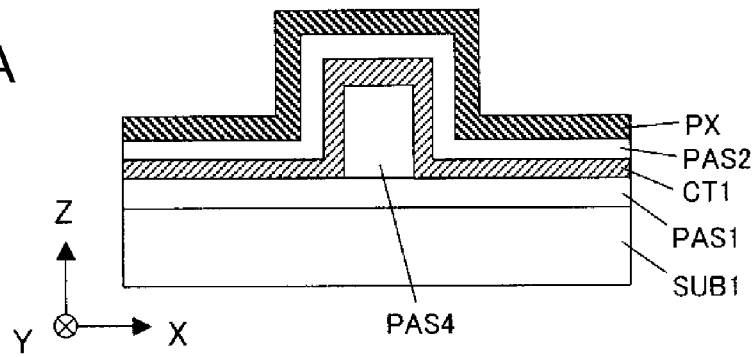
FIGS. 4A to 4F are diagrams illustrating a process of forming a wall pixel electrode of the liquid crystal display device which is a display device according to the first embodiment of the invention.

The thin film transistor TFT including the gate lines GL and the like, the drain lines DL, the insulating interlayer PAS1, the pseudo wall electrode insulating film PAS4, the wall electrode insulating film PAS3, the common electrode CT1, and the insulating interlayer PAS2 are sequentially formed on the liquid crystal surface side of the first substrate SUB1. Thereafter, as shown in FIG. 4A, the transparent conductive film which is the wall pixel electrode PX is formed in the upper layer of the insulating interlayer PAS2 so as to cover at least the whole surface of a pixel area AR of the first substrate SUB1.

b) Process of Applying Low-Affinity Material LAF

Figure 4B:
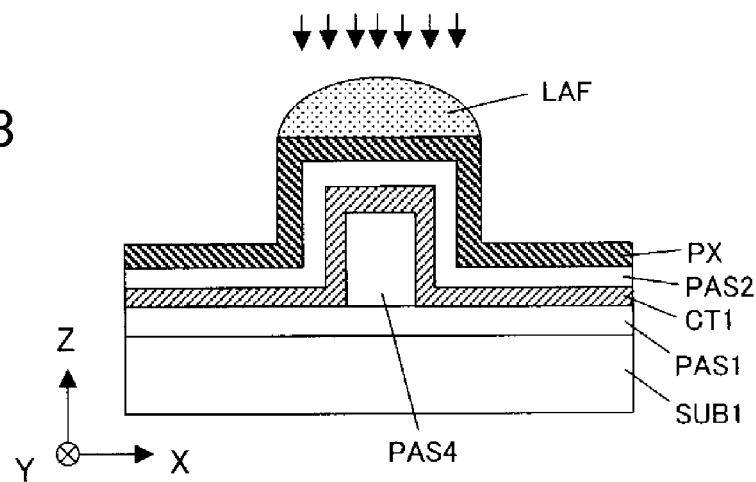

A material having a hydrophobic property, that is, a material LAF having a low affinity for the resist (first resist) REG (hereinafter, referred to as low-affinity material) is applied to an area of an upper layer of the transparent conductive film that covers the head portions of the wall electrode insulating film PAS3 and the pseudo wall electrode insulating film PAS4, and is then fixed (FIG. 4B). The area to which the low-affinity material (second resist) LAF is applied is an area corresponding to a portion which is the opening of the resist REG in the process to be described later, that is, a portion in which the transparent conductive film formed in the lower layer of the resist REG is etched. Meanwhile, the low-affinity material LAF may be a material that has a low wettability with respect to a resist material for forming the resist REG and that has a property of bouncing the liquid resist REG, for example, a hydrophilic material such as polyvinyl alcohol (PVA) or a urea resin, and may be a well-known hydrophilic resist or the like. In addition, insofar as the opening in which the second wall-shaped electrode PX2 is etched in the etching process to be described later is not formed, the area to which the low-affinity material LAF is applied may also include the periphery of the head portion as necessary.

At this time, in the process of applying the low-affinity material LAF of the first embodiment, although the low-affinity material LAF is applied to all areas for forming the openings in the resist REG, the invention is not limited thereto. For example, as will be described later, depending on the method of applying the low-affinity material LAF, the openings may be formed in the resist REG by only applying the low-affinity material LAF, or the low-affinity material LAF may be applied to at least the head portions of the wall electrode insulating film PAS3 and the pseudo wall electrode insulating film PAS4 and then the openings in other areas may be formed by exposing and developing the resist REG as in the related art.

The low-affinity material LAF may be applied through any of various methods, for example, a method of directly printing the low-affinity material LAF onto the surface of the first substrate SUB1 using an inkjet method, or a method of transferring the low-affinity material LAF using a transfer method.

When the low-affinity material LAF is directly printed onto the surface of the first substrate SUB1 using an inkjet method, force to stay in the head portions of the wall electrode insulating film PAS3 and the pseudo wall electrode insulating film PAS4 by surface tension thereof acts on a liquid affinity material LAF right after the printing, and thus a so-called self-alignment effect is obtained. As a result, the low-affinity material LAF can be precisely printed (applied) onto the head portions of the wall electrode insulating film PAS3 and the pseudo wall electrode insulating film PAS4 with a high level of accuracy. In particular, since the inkjet method may apply the low-affinity material LAF to an arbitrary location, it is possible to obtain a special effect where the openings can be formed in the resist REG by simply applying the low-affinity material LAF, which will be described later.

In addition, in the application using the inkjet method, it is possible to individually control the application of the low-affinity material LAF to the head portions of the wall electrode insulating film PAS3 and the pseudo wall electrode insulating film PAS4. Accordingly, in the head portions of the wall electrode insulating film PAS3 and the pseudo wall electrode insulating film PAS4, it is also possible to apply the low-affinity material LAF to any one head portion and not to apply the low-affinity material LAF to the other head portion. However, in this case, after applying the liquid resist REG in the subsequent process, it is necessary to form the opening in the thin film-shaped resist REG using well-known exposing and developing processes.

On the other hand, in the application of the low-affinity material LAF using the transfer method, the low-affinity material LAF which is a second resist material on a surface of a thin sheet on a film, and a transfer film that transfers the low-affinity material LAF to the surface of the first substrate SUB1 is used. However, when the transfer film is used, a transfer film is used in which a hydrophilic material is disposed as the low-affinity material LAF to be transferred to the film surface.

In the application of the low-affinity material LAF using the transfer film, the low-affinity material LAF is applied to each of the wall electrode insulating film PAS3 and the pseudo wall electrode insulating film PAS4 that protrude in a convex shape in the surface of the first substrate SUB1. Alternatively, the low-affinity material LAF is applied to only the head portion of the wall electrode insulating film PAS3 that is larger than the pseudo wall electrode insulating film PAS4. For example, a hydrophilic material is transferred to the head surfaces of the wall electrode insulating film PAS3 and the pseudo wall electrode insulating film PAS4 using the transfer film that transfers a hydrophilic material as the low-affinity material LAF. At this time, since the head portions of the wall electrode insulating film PAS3 and the pseudo wall electrode insulating film PAS4 are formed on the surface side of the first substrate SUB1 so as to largely protrude compared to other portions, the low-affinity material LAF can be accurately and easily applied to only the head portion. In other words, since a lithography technique is used even in the process of forming the wall electrode insulating film PAS3 and the pseudo wall electrode insulating film PAS4, the formation location thereof has a margin of error resulting from the positioning accuracy between the first substrate SUB1 and a photomask. However, when using the transfer film, the low-affinity material LAF is transferred to only portions of the wall electrode insulating film PAS3 and the pseudo wall electrode insulating film PAS4 which protrude from the surface of the first substrate SUB1, and thus a so-called self-alignment effect is obtained. As a result, a special effect is obtained that the low-affinity material LAF can be applied to the head surfaces of the wall electrode insulating film PAS3 and the pseudo wall electrode insulating film PAS0 with a high level of accuracy.

Meanwhile, in the transfer method, although it is suitable for the application (transfer) of the low-affinity material LAF to the head portion of the portion that is formed in a convex shape, it may be difficult to apply the low-affinity material LAF to an area close to the convex portion. Accordingly, when the openings are formed in the resist REG in order to separate the transparent conductive film which is the wall pixel electrode PX in an extension direction (Y-axis direction) of the drain lines DL, the resist REG that is sensitive to light may be used, and the openings may be formed using exposing and developing processes in the same manner as the related art.

In addition, similar to the case of applying the low-affinity material LAF using the inkjet method, the low-affinity material LAF applied using the transfer film is not limited to a well-known resist material. For example, in a process of peeling the low-affinity material LAF which will be described later, as long as a material can be easily peeled, a synthetic resin for other purposes such as a photocurable resin may be used as the low-affinity material LAF.

c) Process of Applying Resist REG

Figure 4C:
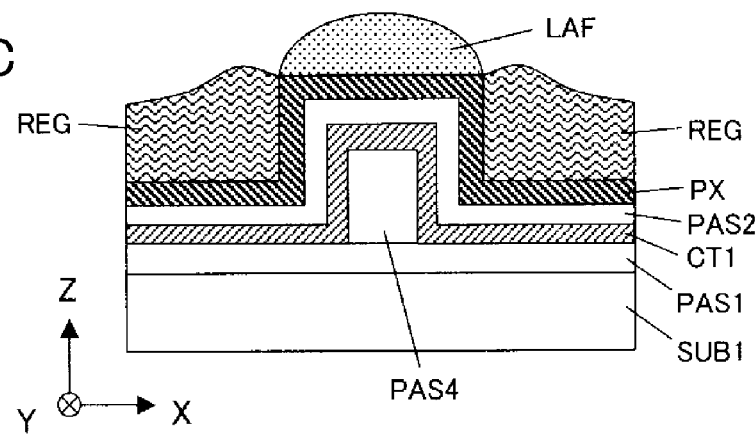

As shown in FIG. 4C, after the liquid resist REG is applied to the whole surface of the first substrate SUB1 which faces the liquid crystal layer LC using a well-known method such as a spin coat method or a slit coat method, the resist REG is hardened, and thus the thin film-shaped liquid resist REG is formed. At this time, in the configuration of the first embodiment, a resist material having a low wettability and an anti-wettability with respect to the low-affinity material LAF, that is, a resist material having a low affinity for the low-affinity material LAF, is used. For example, a resist material having a hydrophobic property such as a fluorocarbon resin is used as the resist material.

When applying the liquid resist REG to the surface of the first substrate SUB1, the low-affinity material LAF having a low affinity for the resist REG is applied in advance to at least the upper layer of the transparent conductive film that covers the head portions of the wall electrode insulating film PAS3 and the pseudo wall electrode insulating film PAS4, and thus the liquid resist REG is not applied to the upper layer of the transparent conductive film that covers the head portions of the wall electrode insulating film PAS3 and the pseudo wall electrode insulating film PAS4. In other words, the liquid resist REG which is applied to the surface of the first substrate SUB1 bounces in the portion where which the low-affinity material LAF is applied, by interaction with the low-affinity material LAF having a hydrophilic property.

As a result, as shown in FIG. 4C, even in a hardening process of hardening the resist REG after the application, the resist REG is not formed in the upper layer of the transparent conductive film that covers the head portions of the wall electrode insulating film PAS3 and the pseudo wall electrode insulating film PAS4.

d) Removal of Low-Affinity Material LAF

For example, only the low-affinity material LAF is selectively removed (peeled) using a well-known dry process or a wet process. At this time, when a well-known hydrophilic resist material is used as the low-affinity material LAF, only the low-affinity material LAF can be selectively removed (peeled, first asher process) by using a well-known photoexcitation ashing device or a plasma ashing device corresponding to the hydrophilic resist material. Meanwhile, when using any of other hydrophilic materials as the low-affinity material LAF, the low-affinity material LAF is removed by performing the first asher process corresponding to the low-affinity material LAF.

Figure 4D:
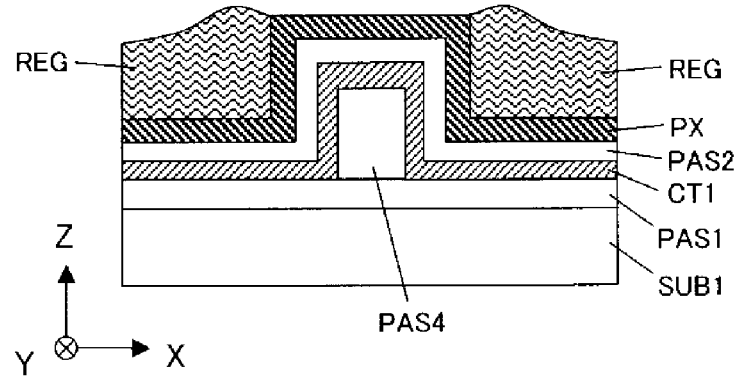

As shown in FIG. 4D, the transparent conductive film that is formed in the head portion of the pseudo wall electrode insulating film PAS4 is exposed from the resist REG by the removing process (first asher process) of the low-affinity material LAF. In other words, the resist REG is formed which serves as a protective film when patterning the transparent conductive film that is formed on a lower layer side of the resist REG. In this case, the exposing and developing processes of the resist REG are unnecessary because the openings can be formed in the resist REG by only applying and removing the low-affinity material LAF, it is possible to obtain a special effect that a throughput for manufacturing the first substrate SUB1 can be greatly improved. In addition, since the low-affinity material LAF is formed in the head portions of the wall electrode insulating film PAS3 and the pseudo wall electrode insulating film PAS4 by a self-alignment effect with a high level of accuracy, the openings of the resist REG which is formed by removing the low-affinity material LAF can also be formed with accuracy that is equal to or greater than the positioning accuracy of the manufacturing device. As a result, since the line of electric force generated between the wall pixel electrode PX and the pseudo wall common electrode CT including the common electrode CT1 and the common electrode CT2 becomes a desired line of electric force, the display mode efficiency can be improved, and the display quality can be improved.

However, in the above-described "b) Process of Applying of Low-Affinity Material LAF", when the low-affinity material LAF is applied to only the head surfaces of the wall electrode insulating film PAS3 and the pseudo wall electrode insulating film PAS4, the openings of the resist REG are formed in only the head surfaces of the wall electrode insulating film PAS3 and the pseudo wall electrode insulating film PAS4 in the process. For this reason, when there is a need to form another opening in the resist REG, another opening is formed in the resist REG by exposing and developing processes using a photomask PM, as in the related art, before or after the removal of the low-affinity material LAF.

e) Process of Etching Transparent Conductive Film

Figure 4E:
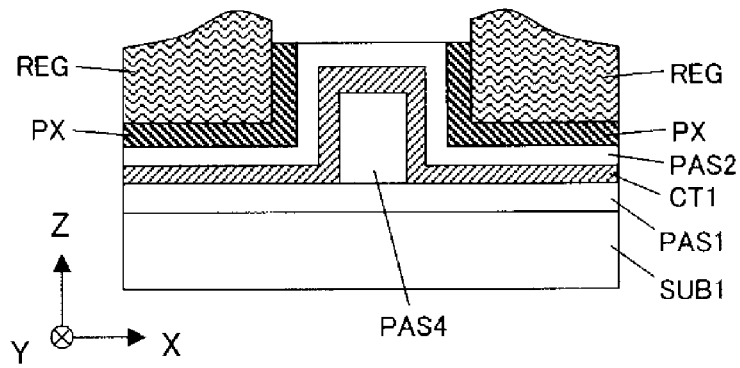

Next, the transparent conductive film of the portion that is exposed from the resist REG is etched by a well-known etching process, and the insulating interlayer PAS2 formed in a lower layer thereof is exposed. In other words, the transparent conductive film that is exposed from the openings of the resist REG is removed by a wet etching using the resist REG as an etching mask. As shown in FIG. 4E, only the transparent conductive film of the head portion of the pseudo wall electrode insulating film PAS4 is removed by the etching process. At this time, even in the wall electrode insulating film PAS3 (not shown), only the transparent conductive film of the head portion is removed. Meanwhile, the etching method is not limited to the wet etching, and a well-known dry etching may be used.

f) Process of Removing Resist REG

Figure 4F:
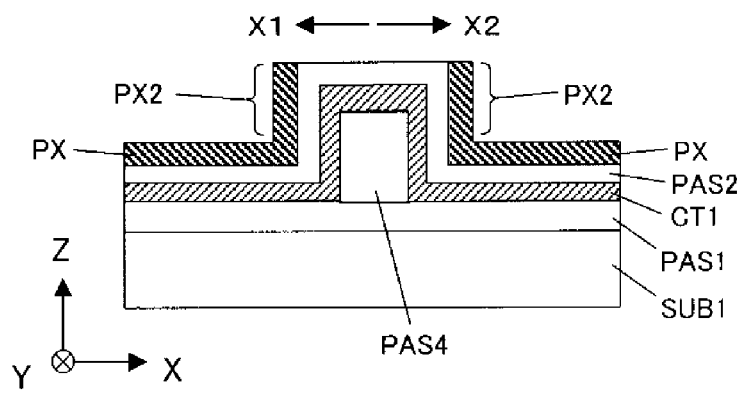

Next, a removing (peeling) process (second asher process) corresponding to the resist material is performed by using a well-known photoexcitation ashing device or plasma ashing device. As shown in FIG. 4F, the second wall-shaped electrode PX2 is formed in side wall surfaces of the pseudo wall electrode insulating film PAS4 on an X1 side and an X2 side by removing the resist REG. Similarly, the first wall-shaped electrode PX1 is formed in side wall surfaces of the wall electrode insulating film PAS3 (not shown).

Thereafter, after the insulating film PAS5 is formed through a well-known thin film forming process, an orientation film ORI is formed in an upper layer thereof, and a well-known orientation process such as a rubbing process is performed, and thus the first substrate SUB1 is formed. As such, in the manufacturing method of the first embodiment, an opening, that is, an etching mask pattern, is formed by the low-affinity material LAF before applying the resist REG, and the etching mask formed of the resist REG is formed by applying and fixing the resist REG and removing (peeling) of the low-affinity material LAF.

Figure 5:
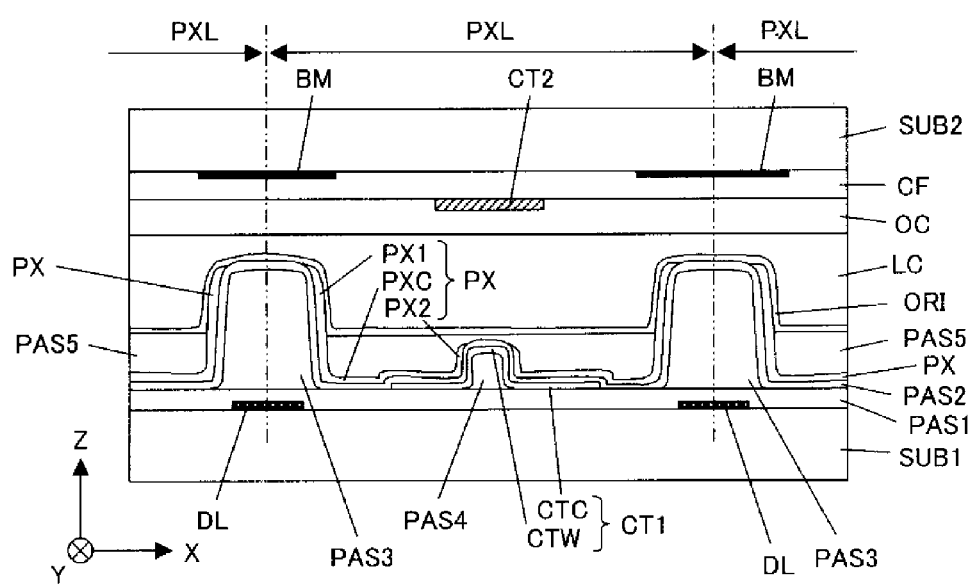
FIG. 5 is a cross-sectional view illustrating a pixel structure formed using a method of manufacturing the liquid crystal display device which is a display device according to the first embodiment of the invention.

FIG. 5 is a cross-sectional view illustrating a pixel structure formed using a method of manufacturing the liquid crystal display device according to the first embodiment of the invention. As obvious from FIG. 5, in the above-described manufacturing method, it is possible to form a transparent electrode (wall pixel electrode PX) in which only the transparent conductive films at the tops of the wall electrode insulating film PAS3 and the pseudo wall electrode insulating film PAS4 are etched rather than etching the transparent conductive film formed on the side wall surface sides of the wall electrode insulating film PAS3 and the pseudo wall electrode insulating film PAS4. As a result, it is possible to cause the second wall-shaped electrodes PX2 that are formed on the right and left sides (corresponding to X1 side and X2 side of FIG. 4F) of the pseudo wall electrode insulating film PAS4 in FIG. 5 to have approximately the same shape. Further, the first wall-shaped electrodes PX1 that are formed in a peripheral portion in the same pixel can be formed so as to have shapes symmetrical to each other. In particular, in the configuration in which the pseudo wall electrode insulating film PAS4 is formed in a center portion of the pixel in a short-side direction (X-axis direction), the wall pixel electrodes PX can be formed so as to have shapes symmetrical to each other with respect to the short-side direction in the same pixel. In other words, in the same pixel, the wall pixel electrodes PX can be formed so as to be symmetrical to each other on the X1 side and the X2 side of the pseudo wall electrode insulating film PAS4 in the liquid crystal display device using the first substrate SUB1. As a result, the display mode efficiency of the liquid crystal display device can be improved, and the display quality can be considerably improved.

In addition, in the process of applying the liquid resist REG for forming the resist REG, in the head portions of the wall electrode insulating film PAS3 and the pseudo wall electrode insulating film PAS4 in which the low-affinity material LAF is formed, the applied resist REG bounces by the low-affinity material LAF, and thus an area where the resist REG is not applied is formed. In addition, since the resist REG is applied to the area where the low-affinity material LAF is not applied in a manner similar to the related art, only the low-affinity material LAF is selectively removed in the subsequent process, and thus it is possible to form an etching mask corresponding to the resist REG using the area where the low-affinity material LAF is formed as the opening, that is, to a formation pattern of the wall pixel electrode PX, by a self-alignment effect with a high level of positioning accuracy. Accordingly, it is possible to prevent the poor formation of the second wall-shaped electrode PX2 and the first wall-shaped electrode PX1 that constitute the wall pixel electrode PX which is associated with the misalignment of the formation location of the opening of the resist REG.

Further, in the configuration in which the pseudo wall electrode insulating film PAS4 is formed in the center portion of the pixel in the short-side direction (X-axis direction), the wall pixel electrode PX can be formed so as to have shapes symmetrical to each other with respect to the short-side direction in the same pixel. As a result, the display mode efficiency of the liquid crystal display device can be improved, and the display quality can be considerably improved.

Figure 6:
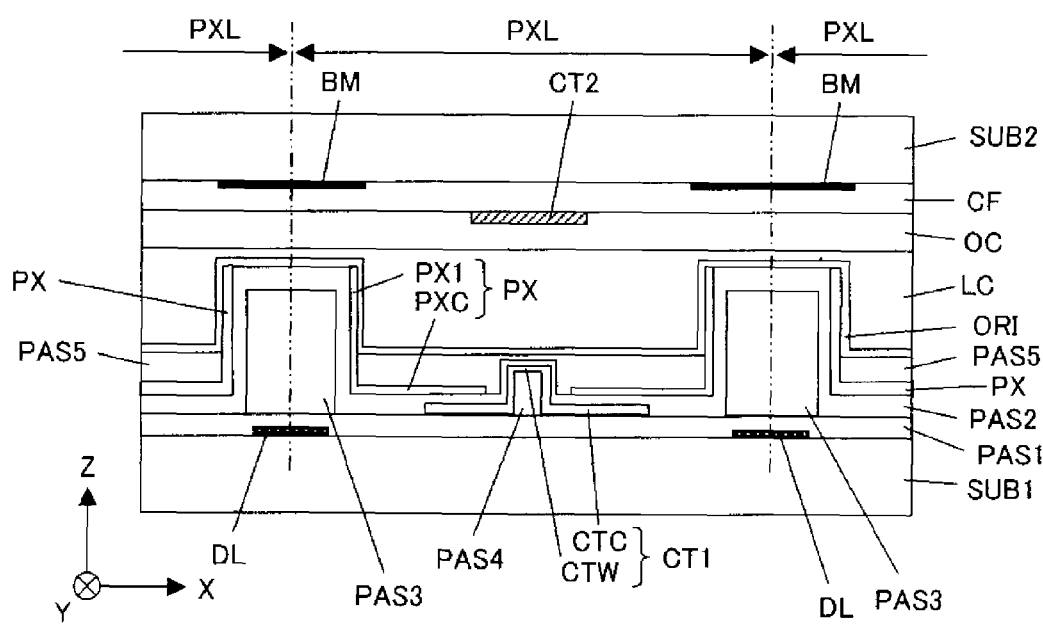
FIG. 6 is a cross-sectional view illustrating another pixel configuration of the liquid crystal display device which is a display device according to the first embodiment of the invention.

In addition, the manufacturing method of the liquid crystal display device of the invention is not limited to a case where the wall pixel electrode PX includes the first wall-shaped electrode PX1, the flat electrode PXC, and the second wall-shaped electrode PX2. For example, as shown in FIG. 6, the manufacturing method thereof can also be applied to the liquid crystal display device in which the wall pixel electrode PX includes the first wall-shaped electrode PX1 and the flat electrode PXC. In the liquid crystal display device shown in FIG. 6, the wall pixel electrode PX is only different from that of the liquid crystal display device shown in FIG. 1, and other components are the same as those of the liquid crystal display device shown in FIG. 1. Accordingly, when the manufacturing method of the liquid crystal display device of the invention is used, in the above-described "b) Process of Applying of Low-Affinity Material LAF", a desired opening can be formed in the resist REG by applying the low-affinity material LAF to only the head surface of the wall electrode insulating film PAS3 or by applying the low-affinity material LAF to the head surfaces of the wall electrode insulating film PAS3 and the pseudo wall electrode insulating film PAS4, the side wall surfaces of the pseudo wall electrode insulating film PAS4, and the vicinity of the side wall surfaces thereof, and thus the above-described effect is obtained.

To this, when the wall pixel electrode is formed using a manufacturing method of the related art using a photolithography technique, the misalignment between the photomask and the first substrate SUB1 occurs, and thus it is significantly difficult to form the first wall-shaped electrode PX1 and the second wall-shaped electrode PX2 that constitute the wall pixel electrode PX.

Figure 8A:
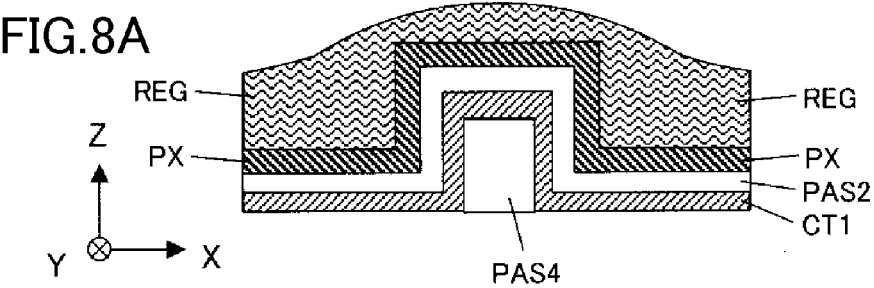
FIGS. 8A to 8D are diagrams illustrating a process of forming a wall pixel electrode by a manufacturing method of the related art using a photolithography technique.
Figure 8B:
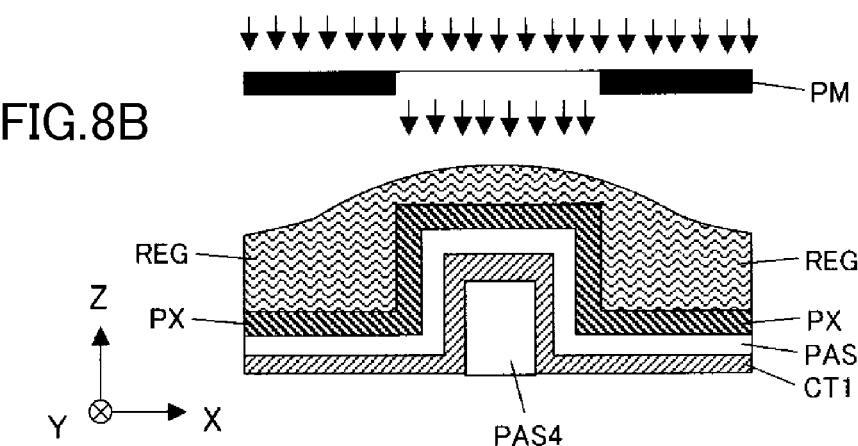
Figure 8C:
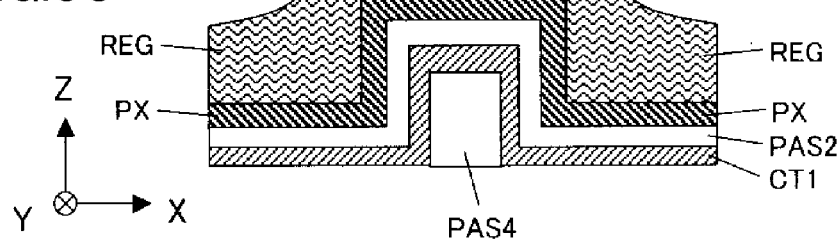
Figure 8D:
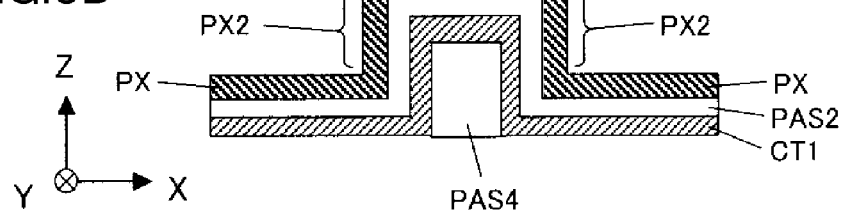
Figure 9A:
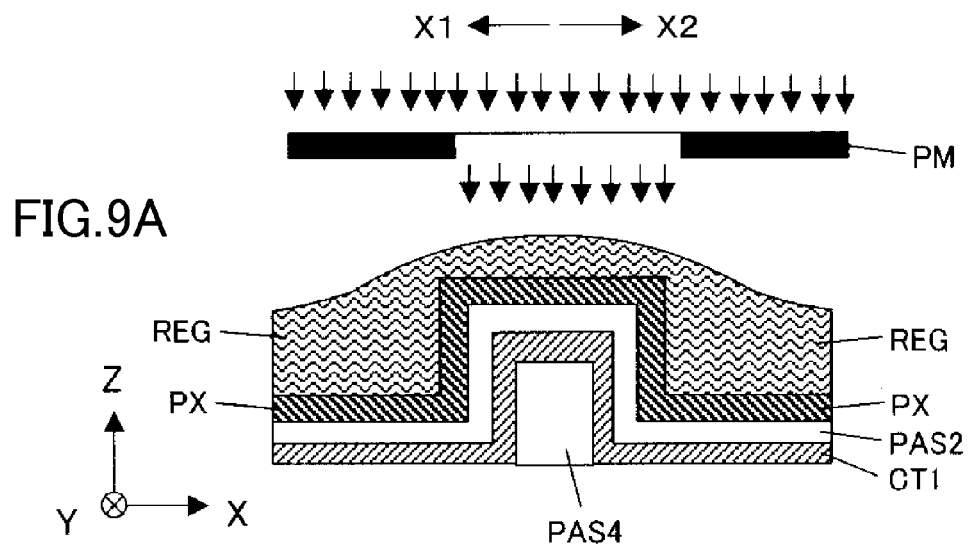
FIGS. 9A to 9C are diagrams illustrating a case where misalignment occurs in a photomask and a first substrate in a process of exposing a wall pixel electrode using a manufacturing method of the related art.
Figure 9B:
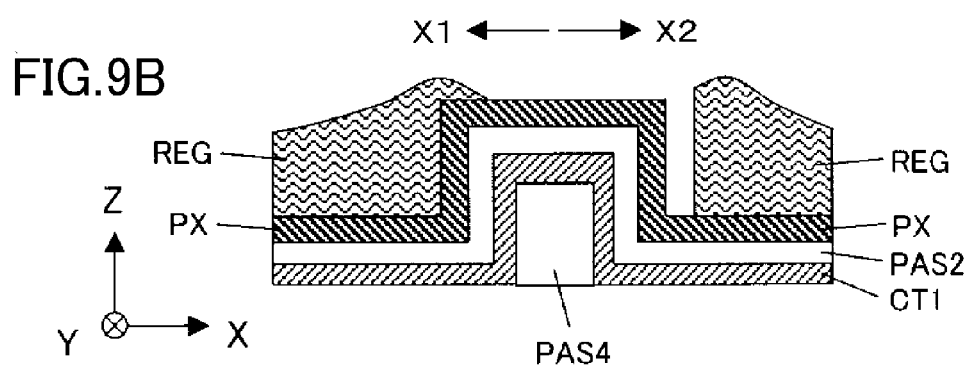
Figure 9C:
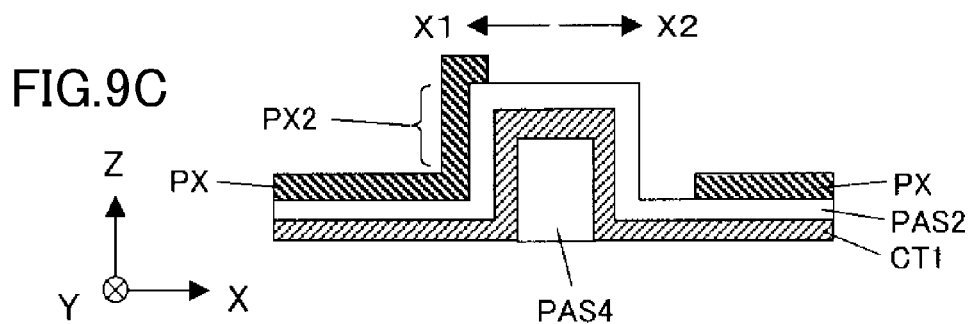

FIGS. 8A to 8D are diagrams illustrating a process of forming the wall pixel electrode using the manufacturing method of the related art using a photolithography technique, and FIGS. 9A to 9C are diagrams illustrating a case where the misalignment between the photomask and the first substrate occurs in a process of exposing the wall pixel electrode using the manufacturing method of the related art. Hereinafter, the misalignment during a resist pattern transfer in the manufacturing method of the related art using a photolithography technique will be described in detail. However, FIGS. 8A to 8D are enlarged views illustrating a process of forming the second wall-shaped electrode PX2 using a photosensitive resist, and correspond to FIGS. 4A to 4F of the first embodiment. Hereinafter, a case of using a positive resist will be described.

As shown in FIG. 8A, in the process of forming the wall pixel electrode PX of the related art using a photolithography technique, first, a liquid resist is applied to a surface of the first substrate SUB1 which faces the liquid crystal layer LC side using, for example, a well-known spin coat method or slit coat method. Next, the applied resist is preliminarily dried (prebaked), and thus the thin film-shaped resist REG that covers the first substrate SUB1 which faces the liquid crystal layer LC is formed.

Next, as shown in FIG. 8B, an exposure light LG is irradiated from the above of the resist REG using the photomask PM for exposure which corresponds to the formation pattern of the wall pixel electrode PX, and the formation pattern of the wall pixel electrode PX is transferred to the resist REG.

Next, as shown in FIG. 8C, the resist REG is developed and calcinated so that the resist REG in which the opening corresponding to the formation pattern of the wall pixel electrode PX, that is, a protective film, is formed. At this time, the transparent conductive film that is exposed from the opening of the resist REG becomes an area to be etched in the later process.

Next, the transparent conductive film is etched using a wet etching method or the like so as to remove the transparent conductive film that is exposed from the opening of the resist REG, and the resist REG is also then removed (peeled). As a result, as shown in FIG. 8D, the wall pixel electrode PX is formed in which the second wall-shaped electrodes PX2 are formed in the side wall surfaces of the pseudo wall electrode insulating film PAS0 on the X1 side and the X2 side.

However, in order to form the second wall-shaped electrodes PX2 as shown in FIG. 8D, in the process of exposing the resist REG shown in FIG. 8B, in particular, the positioning accuracy between the first substrate SUB1 and the photomask PM with respect to the X-axis direction needs to be high with respect to at least the thickness of the transparent conductive film.

For example, as shown in FIG. 9A, when the photomask PM is shifted to the X2 side with respect to the first substrate SUB1 by equal to or greater than the thickness of the transparent conductive film which serves as the second wall-shaped electrode PX2, the exposure place of the resist REG is also shifted to the X2 side. In this case, the opening of the resist REG that is formed by the developing process of the resist REG can also be formed by being shifted to the X2 side as shown in FIG. 9B.

For this, in the etching process, the transparent conductive film of an area corresponding to the opening of the resist REG is etched. As a result, as shown in FIG. 9C, on the X1 side of the pseudo wall electrode insulating film PAS4, the second wall-shaped electrode PX2 is formed such that an end portion thereof covers an upper portion of the pseudo wall electrode insulating film PAS4. On the other hand, on the X2 side of the pseudo wall electrode insulating film PAS4, the transparent conductive film forming the second wall-shaped electrode PX2 is etched (removed) in the etching process, and thus the second wall-shaped electrode PX2 is not formed. In other words, on the X2 side of the pseudo wall electrode insulating film PAS4 in the same pixel, the wall pixel electrode PX includes only the first wall-shaped electrode PX1 and the flat electrode PXC, and thus an electrode structure not including the second wall-shaped electrode PX2 is formed.

As such, when the pixel structure of the first embodiment is formed using a well-known photolithography technique, if the positioning accuracy of an exposure device is equal to or less than the thickness of the transparent conductive film, the configurations of the wall pixel electrodes PX on the X1 side and the X2 side of the pseudo wall electrode insulating film PAS4 are greatly different from each other in the same pixel as described above, thereby resulting in an asymmetric configuration. Accordingly, the display mode efficiency and the display quality are greatly reduced.

As described above, in the method of manufacturing the liquid crystal display device which is the display device according to the first embodiment of the invention, when the wall pixel electrode PX of the liquid crystal display device is manufactured that includes the wall electrode insulating film PAS3 and/or the pseudo wall electrode insulating film PAS4 which are structures formed so as to protrude in a normal direction of the first substrate SUB1, and the wall pixel electrodes PX that are formed on the side wall surfaces of the wall electrode insulating film PAS3 and/or the pseudo wall electrode insulating film PAS4, the transparent conductive films which serve as the wall pixel electrodes PX are formed, and the low-affinity material LAF having a low affinity for the resist REG is then formed on the upper surface of the transparent conductive films that are formed in the head surfaces of the wall electrode insulating film PAS3 and/or the pseudo wall electrode insulating film PAS4. Thereafter, the liquid resist is applied to upper surface of the first substrate SUB1, that is, the upper layer of the transparent conductive film. At this time, since a material having a low affinity for the resist REG, that is, a material having a low wettability, is used as the low-affinity material LAF, the applied liquid resist REG bounces at a place where the low-affinity material LAF is formed. Next, the liquid resist REG is solidified, and thus the resist film REG is formed. Subsequently, since the resist film REG is not formed in the place where the low-affinity material LAF is applied by removing the low-affinity material LAF, the opening of the resist film REG is formed in the head surfaces of the wall electrode insulating film PAS3 and/or the pseudo wall electrode insulating film PAS4 which are places where the low-affinity material LAF is applied, and thus the transparent conductive film is exposed from the opening. Accordingly, a resist mask for etching the transparent conductive films that are formed in the head surfaces of the wall electrode insulating film PAS3 and/or the pseudo wall electrode insulating film PAS4 is formed. Next, the transparent conductive films formed in the head surfaces of the wall electrode insulating film PAS3 and/or the pseudo wall electrode insulating film PAS4 are patterned by etching the transparent conductive film of the lower layer using the resist film REG as the protective film, and the resist film REG is removed, and thus the wall pixel electrode PX is formed.

In other words, in the liquid crystal display device according to the first embodiment, the low-affinity material LAF having a low affinity for the resist is applied in advance so as to form an area where the resist is not applied by interaction between the low-affinity material LAF and the liquid resist material, and thus an area where the resist is not applied, that is, an area where a protective mask is not formed during the etching is formed. Accordingly, an open hole (portion not including resist) is formed that is different from the resist formed by the formation of the resist (protective film) by the exposing·developing processes after the application of the liquid resist REG, and thus the transparent conductive film of the open hole is etched in the etching process.

In particular, in the manufacturing method of the first embodiment, the formation of the opening for etching the transparent conductive film that is formed so as to cover the head portion of the pseudo wall electrode insulating film PAS4 does not depend on the exposing·developing processes of the resist REG. In other words, the material (low-affinity material) LAF having a low affinity for the resist material is applied to the upper layer of the transparent conductive film that covers the head portion of the pseudo wall electrode insulating film PAS4, and the resist REG is then applied thereto, and thus the resist REG is not applied to the area where the low-affinity material LAF is applied. In this configuration, since the opening is formed in the resist which serves as an etching mask, it is possible to suppress (prevent) the poor formation of the first wall-shaped electrode PX1 and the second wall-shaped electrode PX2 by only improving the application accuracy of the low-affinity material LAF that does not depend on the positioning accuracy associated with the exposure. As a result, since the second wall-shaped electrode PX2 can be precisely formed, the display mode efficiency can be improved, and the display quality of the liquid crystal display device can be considerably improved.

In addition, in the pixel configuration of the first embodiment, since the flat electrode PXC and the second flat electrode CTC are disposed so as to face each other with the insulating interlayer PAS2 interposed therebetween, a retentive capacity can be formed. As a result, it is possible to eliminate the need for an area for forming the retentive capacity, and to increase an area through backlight passes, and thus the transmittance of each pixel can be improved, and the display quality can also be improved.

In addition, the area where the resist REG is not applied is formed by only applying the low-affinity material LAF to the head portion of the pseudo wall electrode insulating film PAS4. Therefore, the exposure device having the positioning accuracy of the related art can be used by only improving the positioning accuracy between the device for applying the low-affinity material LAF and the first substrate SUB1. Accordingly, a special effect can be obtained that a decrease in throughput and an increase in manufacturing costs that are associated with the improvement of the positioning accuracy of the exposure device can be suppressed.

Meanwhile, in the manufacturing method of the liquid crystal display device according to the first embodiment, the hydrophobic resist (including lipophilic resist) REG is used, and the liquid resist REG is applied after the low-affinity material LAF which is a hydrophilic material having a low affinity for the hydrophobic resist REG is formed in the head surface of the pseudo wall electrode insulating film PAS4, but the resist material is not limited to a hydrophobic resist material. For example, when the hydrophilic resist REG is used, even though the hydrophilic resist REG is applied after the layer of the low-affinity material LAF is formed in the head surface of the pseudo wall electrode insulating film PAS4 using a hydrophobic material which is a material having a low affinity for the hydrophilic resist REG, the same effect as the above-described effect can be obtained. Further, a material (for example, fluorine compound) having a water-repellent property with respect to a hydrophilic resist and having an oil-repellent property with respect to a lipophilic resist may be used as the low-affinity material LAF.

In addition, in the pixel configuration in the liquid crystal display device according to the first embodiment, the linear common electrode CT2 is also disposed in the second substrate SUB2, and the pseudo wall common electrode CT which is a pseudo wall pixel electrode includes the common electrode CT1 and the common electrode CT2, but the invention is not limited thereto. For example, only the common electrode CT1 may be provided in the first substrate SUB1 rather than providing the common electrode CT2 in the second substrate SUB2.

[Second Embodiment]

FIGS. 7A to 7D are diagrams illustrating a process of forming a wall pixel electrode of a liquid crystal display device which is a display device according to a second embodiment of the invention. Similarly to the first embodiment, FIGS. 7A to 7D show a case where the invention is applied to the formation of the second wall-shaped electrode PX2 that overlaps with the wall common electrode CTW with the insulating film PAS2 interposed therebetween. In particular, in the manufacturing process of the second embodiment, a case is shown where the transparent conductive film forming the second wall-shaped electrode PX2 is patterned using a so-called liftoff method. In addition, in the second embodiment, a material having a low affinity for a conductive film material is used as the low-affinity material LAF.

Hereinafter, a case of forming the second wall-shaped electrode PX2 that overlaps with the wall common electrode CTW with the insulating film PAS2 interposed therebetween will be described, but the invention is not limited thereto, and the invention can also be applied to a flat area. Further, the invention is not limited to the formation of the wall-shaped electrode PX of the liquid crystal display device, and the invention can also be applied to the formation of a conductive film and the formation of a thin film of any of other display devices.

Hereinafter, a method of manufacturing the second wall-shaped electrode PX2 will be described in detail with reference to FIGS. 7A to 7D.

a) Process of Forming up to Insulating Interlayer PAS2

Figure 7A:
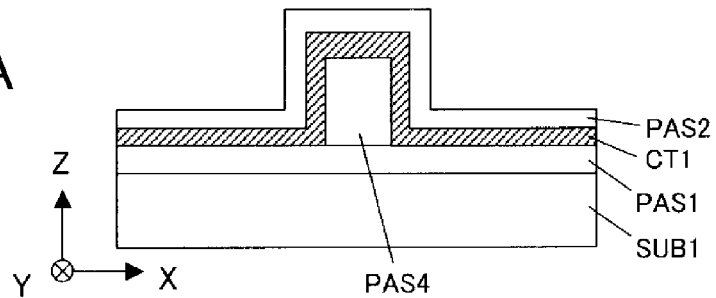
FIGS. 7A to 7D are diagrams illustrating a process of forming a wall pixel electrode of a liquid crystal display device which is a display device according to a second embodiment of the invention.

As shown in FIG. 7A, the thin film transistors TFT (not shown) including the gate lines GL and the like, the drain lines DL (not shown), the insulating interlayer PAS1, the pseudo wall electrode insulating film PAS4, the wall electrode insulating film PAS3 (not shown), the common electrode CT1, and the insulating interlayer PAS2 are sequentially formed on the liquid crystal surface side (upper surface side) of the first substrate SUB1.

b) Process of Applying Low-Affinity Material LAF

Figure 7B:
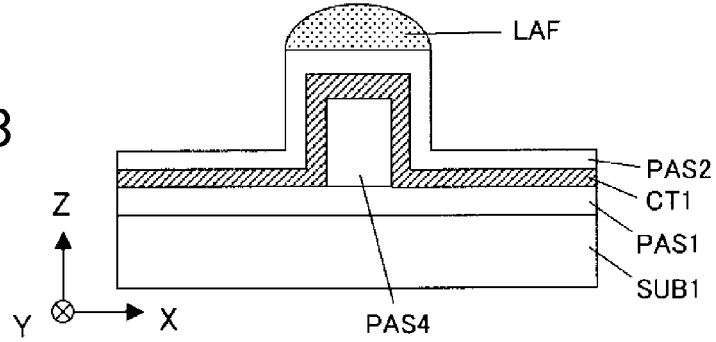

The low-affinity material LAF having a low affinity for a transparent conductive film material to be formed in the later process is applied to an area of an upper surface of the insulating interlayer PAS2 that covers the head portions of the wall electrode insulating film PAS3 and the pseudo wall electrode insulating film PAS4, and is then fixed (FIG. 7B). Similarly to the first embodiment, the area to which the low-affinity material LAF is applied is an area corresponding to a portion where the transparent conductive film is removed in the process to be described later. In addition, similarly to the first embodiment, the application of the low-affinity material LAF can be performed through any of various methods, for example, a method of directly printing the low-affinity material LAF on the surface of the first substrate SUB1 using an inkjet method or a method of transferring the low-affinity material LAF using a transfer method.

c) Process of Forming Transparent Conductive Film Material

Figure 7C:
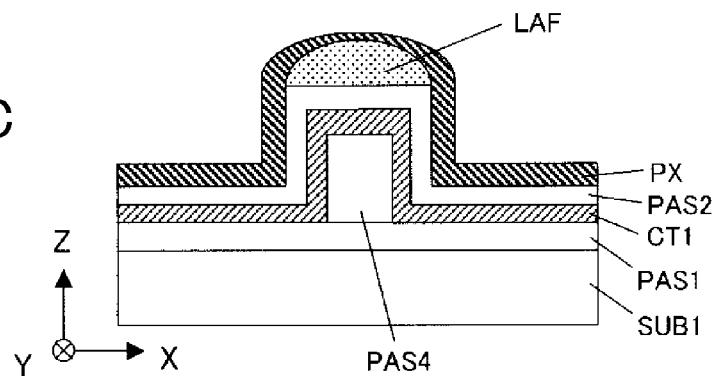

For example, as shown in FIG. 7C, a thin film-shaped transparent conductive film (for convenience of illustration, shown as PX in FIG. 7C) is formed in a surface of the first substrate SUB1 which faces the liquid crystal layer LC using a well-known sputtering method, or is formed by applying and hardening an application type transparent conductive film material such as a liquid ITO (Indium Tin Oxide).

In particular, in the second embodiment, when the application type transparent conductive film material represented by an application type ITO (Indium Tin Oxide) is used to form the transparent conductive film, the transparent conductive film material is also applied to the upper surface of the low-affinity material LAF. At this time, a material having a low affinity for the transparent conductive film material is used as the low-affinity material LAF of the second embodiment. Accordingly, the transparent conductive film material is not partially or entirely covered by the application type transparent conductive film material in the upper surface of the low-affinity material LAF, or even when the low-affinity material LAF is covered by the transparent conductive film material, the thickness of the transparent conductive film material is thinly formed at the upper surface of the low-affinity material LAF. As a result, in the manufacturing method of the second embodiment, when the low-affinity material LAF and the transparent conductive film PX at the top thereof are removed together in the subsequent process, it is possible to obtain a special effect that an end of an electrode pattern generated in an end of the transparent conductive film material when using a positive resist material can be prevented from remaining so as to protrude toward the upper surface. However, by appropriately selecting the film thickness of the low-affinity material LAF and the film thickness of the application type transparent conductive film, it is possible to form the opening from which the low-affinity material LAF is exposed in a part of the transparent conductive film that is formed in the upper surface of the low-affinity material LAF. By such a configuration, since the low-affinity material LAF can be prevented from being safely covered by the transparent conductive film, it is possible to obtain a special effect that the intrusion of a peeling component into a rear surface of the transparent conductive film during an asher process of the low-affinity material LAF to be described later, that is, the contact between the low-affinity material LAF and a peeling agent can be easily performed.

d) Removal of Low-Affinity Material LAF

Figure 7D:
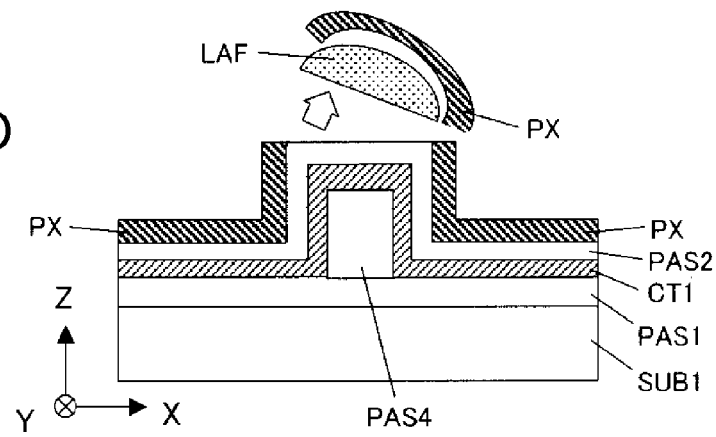

The low-affinity material LAF is removed (peeled) using a well-known asher process corresponding to a well-known low-affinity material LAF. At this time, even in the configuration of the second embodiment, the transparent conductive film is formed so as to partially or entirely cover an upper surface of the low-affinity material LAF. Accordingly, as shown in FIG. 7D, in association with the peeling of the low-affinity material LAF, only the transparent conductive film that is formed in the upper surface of the low-affinity material LAF is selectively removed (peeled) as indicated by an outlined arrow of FIG. 7D in the transparent conductive film that is formed so as to cover the surface of the first substrate SUB1. As a result, as shown in FIG. 4F of the first embodiment, the second wall-shaped electrode PX2 is formed in the side wall surfaces of the pseudo wall electrode insulating film PASO on the X1 side and the X2 side. Similarly, the first wall-shaped electrode PX1 is formed in the side wall surface of the wall electrode insulating film PAS3 (not shown).

Thereafter, after forming the insulating film PASS using a well-known method of forming a thin film, the orientation film ORI is formed in an upper layer thereof, and a well-known orientation process such as a rubbing process is performed, and thus the first substrate SUB1 is formed.

As such, in the method of manufacturing the liquid crystal display device of the second embodiment, first, a desired pattern is formed using the low-affinity material LAF in the surface of the insulating interlayer PAS2 using a transfer method or an inkjet method. Next, after the transparent conductive film is formed on the upper surface of the first substrate SUB1 including an upper surface thereof, the low-affinity material LAF and the transparent conductive film of the upper surface thereof are selectively removed (peeled) using an asher process, and thus the same effect as the first embodiment can be obtained.

For example, it is possible to suppress (prevent) the poor formation of the first wall-shaped electrode PX1 and the second wall-shaped electrode PX2 by only improving the application accuracy of the low-affinity material LAF that does not depend on the positioning accuracy associated with exposure. As a result, since the second wall-shaped electrode PX2 can be precisely formed, the display mode efficiency can be improved, and the display quality of the liquid crystal display device can be considerably improved.

In addition, in the manufacturing method of the thin film of the second embodiment using a liftoff method, since each thin film can be patterned without using an exposure device, a so-called photo process including the application process, the exposing process, and the developing process of the resist material and an etching process using a resist as an etching mask are not necessary, and thus a throughput can be further improved, and the productivity can be improved.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of manufacturing a display device that includes a structure that is formed so as to have a protrusion at least in a normal direction of a first substrate, and an electrode that is formed on a side wall surface of the structure, the method comprising:
   forming a transparent conductive which becomes the electrode;
   forming a low-affinity material having a lower affinity for a resist film than the structure, on an upper surface of the transparent conductive film above a top surface of the protrusion of the structure;
   forming the resist film by applying a liquid resist material to the transparent conductive film and then fixing the resist material;
   forming an opening that exposes the transparent conductive film in the resist film by removing the low-affinity material;
   etching the transparent conductive film which is a lower layer using the resist film as a protective film; and
   removing the resist film.

2. The method according to claim 1,
   wherein the structure includes a first structure that is formed at least in a pixel boundary portion in a long-side direction to have a protrusion,
   wherein the electrode includes a first electrode formed of a pair of first wall-shaped electrodes that are formed on a side wall surface of the first structure, and a second electrode that is formed in a pixel display area interposed between the pair of first wall-shaped electrodes and formed along an extension direction of the first electrode, and
   wherein an application location of the low-affinity material includes at least a top surface of the protrusion of the first structure.

3. The method according to claim 1,
   wherein the structure includes first structures each of which is formed at least in the pixel boundary portion in a long-side direction, and a second structure that is formed in the pixel display area interposed between the first structures and formed to have a protrusion at least along an extension direction of the first structures, wherein the electrode includes a first electrode formed of a pair of first wall-shaped electrodes that are formed on the side wall surface of the first structure, and a second wall-shaped electrode that is formed so as to cover a head surface and a side wall surface of the second structure, and wherein the application location of the low-affinity material includes at least a top surface of the protrusion of the second structure.

4. The method according to claim 3,
wherein the first electrode includes a flat electrode that extends to the pixel display area from a lower end of the first wall-shaped electrode, and the second wall-shaped electrode that extends from an end of the flat electrode so as to be formed on the side wall surface of the second structure and that are disposed so as to overlap with the second electrode with an insulating film interposed therebetween.

5. The method according to claim 3,
wherein the second structure has a protrusion amount from the first substrate which is smaller than the first structure.

6. The method according to claim 1,
wherein the application of the low-affinity material includes applying the low-affinity material to a predetermined location using a transfer method that attaches the low-affinity material to a film surface and transfers the low-affinity material attached to the film surface to the surface of the first substrate.

7. The method according to claim 1,
wherein the application of the low-affinity material includes applying the low-affinity material to a predetermined location using an inkjet printing method that directly prints a liquid low-affinity material to the surface of the first substrate.

8. A method of manufacturing a display device that includes a structure that is formed so as to have a protrusion at least in a normal direction of a first substrate, and an electrode that is formed on a side wall surface of the structure, the method comprising:
forming a low-affinity material on a top surface of the protrusion of the structure, the low-affinity material having lower affinity than the structure for a transparent conductive film which becomes the electrode;
depositing a material for the transparent conductive film on an upper surface of the first substrate; and
removing the low-affinity material on the top surface of the protrusion of the structure.

9. The method according to claim 8,
wherein the transparent conductive film is formed by applying a liquid transparent conductive film material to the upper surface of the first substrate.

\* \* \* \* \*